United States Patent [19]

Resnick et al.

[11] Patent Number: 4,538,233

[45] Date of Patent: Aug. 27, 1985

[54] APPARATUS AND METHOD FOR OSCILLATORY MOTION CONTROL

[75] Inventors: Brian J. Resnick; Elena R. Messina; Madhukar Bhatia; John G. Holmes, all of Cincinnati, Ohio

[73] Assignee: Cincinnati Milacron Inc., Cincinnati, Ohio

[21] Appl. No.: 435,259

[22] Filed: Oct. 19, 1982

[51] Int. Cl.³ .................. G06F 15/46; G05B 19/42
[52] U.S. Cl. ............................ 364/513; 364/169; 318/568; 318/574; 901/2; 901/14; 901/16
[58] Field of Search ........... 219/125.1, 125.11, 125.12; 228/27–28; 318/567–570, 573–574; 364/169, 513; 901/2, 9–10, 14–16, 41–42

[56] References Cited

U.S. PATENT DOCUMENTS

| | | | |
|---|---|---|---|
| 3,452,180 | 6/1969 | Bollinger et al. | 219/125 |
| 3,542,996 | 11/1970 | Bollinger et al. | 219/125 |
| 3,619,552 | 11/1971 | Cape | 228/28 X |
| 3,832,522 | 8/1974 | Arikawa et al. | 228/27 X |
| 3,844,469 | 10/1974 | Westfall | 228/28 |
| 4,150,329 | 4/1979 | Dahlstrom | 318/574 |
| 4,158,161 | 6/1979 | Suzuki | 901/10 X |
| 4,188,525 | 2/1980 | Merrick et al. | 219/125.12 |
| 4,336,440 | 6/1982 | Cook et al. | 219/125.12 X |
| 4,368,375 | 1/1983 | Merrick et al. | 219/125.12 |
| 4,453,221 | 6/1984 | Davis et al. | 364/513 |

OTHER PUBLICATIONS

Heitmayer et al., "Opportunities in the Adaptive Control of Welding Robots by the Effective Use of Sensors", *Conference Proceedings*, Nov. 1980, pp. 42-1 to 42-9.

Primary Examiner—Jerry Smith
Assistant Examiner—Gary V. Harkcom
Attorney, Agent, or Firm—John W. Gregg

[57] ABSTRACT

An apparatus and method are provided for controlling the motion of a point associated with a function element carried by a machine. The motion describes an oscillatory pattern in a selectable plane through a path between two positions defined by input signals. The oscillatory motion pattern defines cyclic excursions about the path. Motion is effected by iteratively interpolating intermediate positions along the path, computing incremental excursion amplitudes associated with the intermediate position displacements, calculating coordinates of the intermediate position excursions and producing machine actuator control signals to move the machine members to advance the point from its position along the pattern to an intermediate position.

12 Claims, 17 Drawing Figures

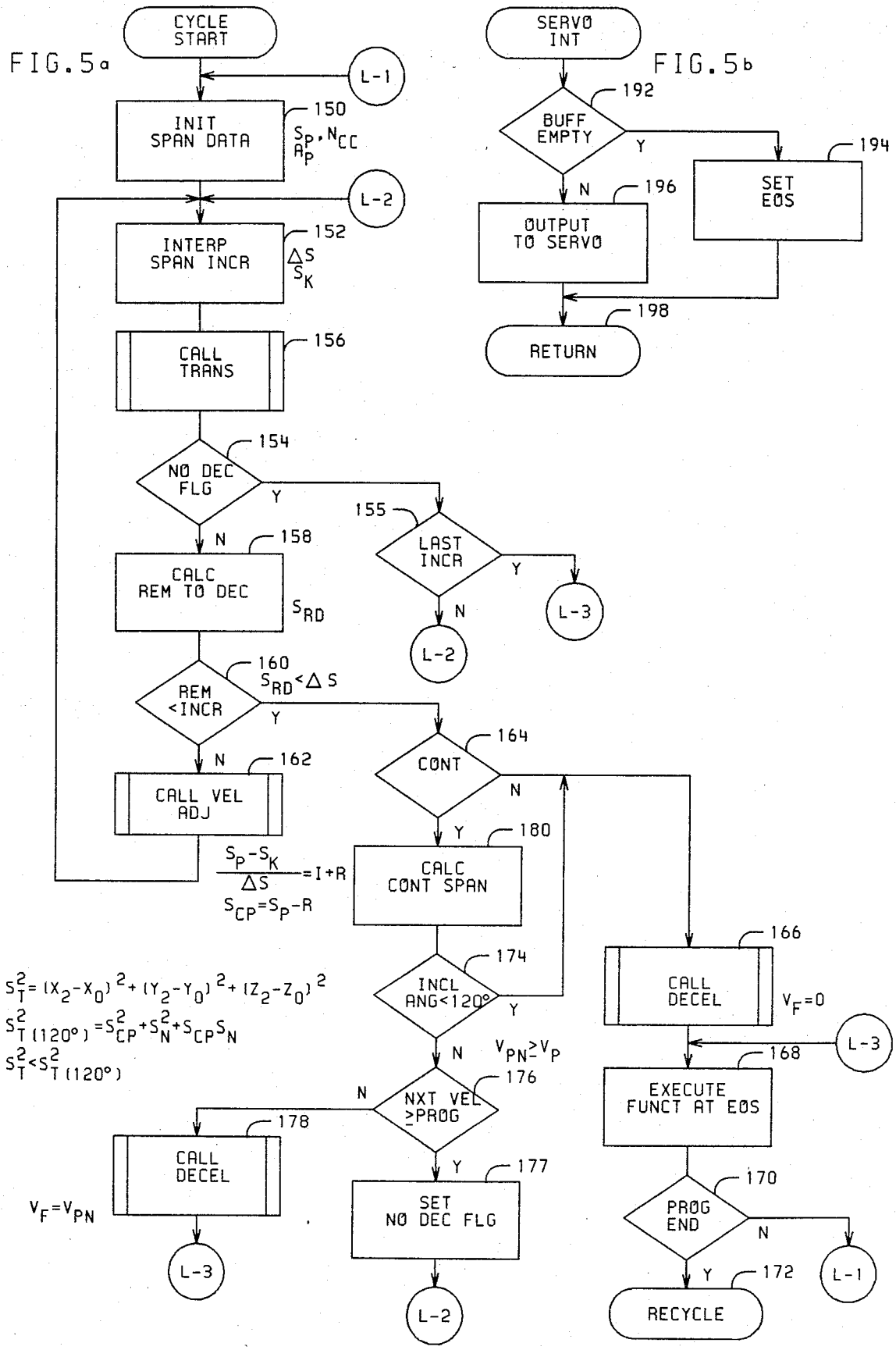

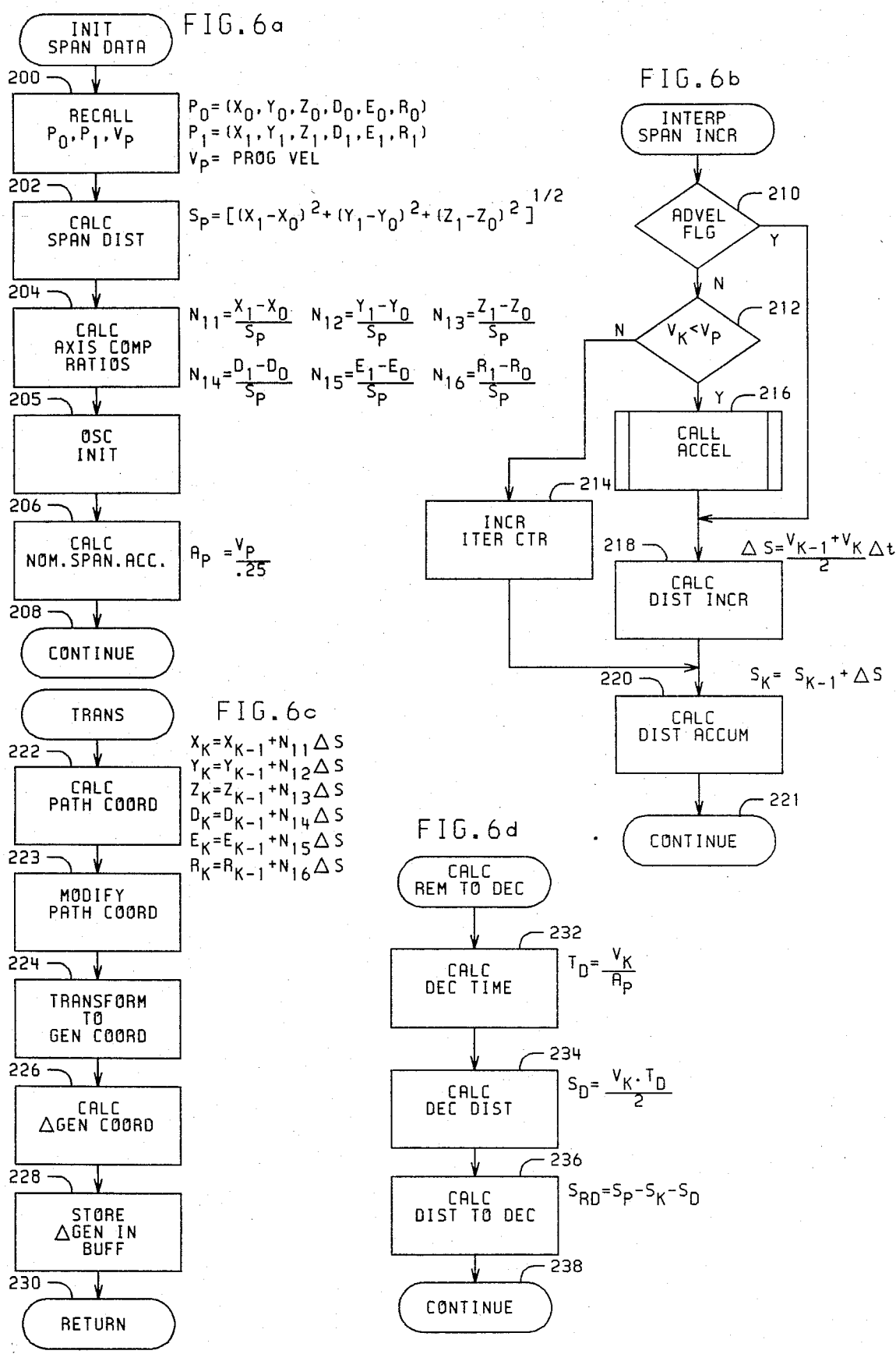

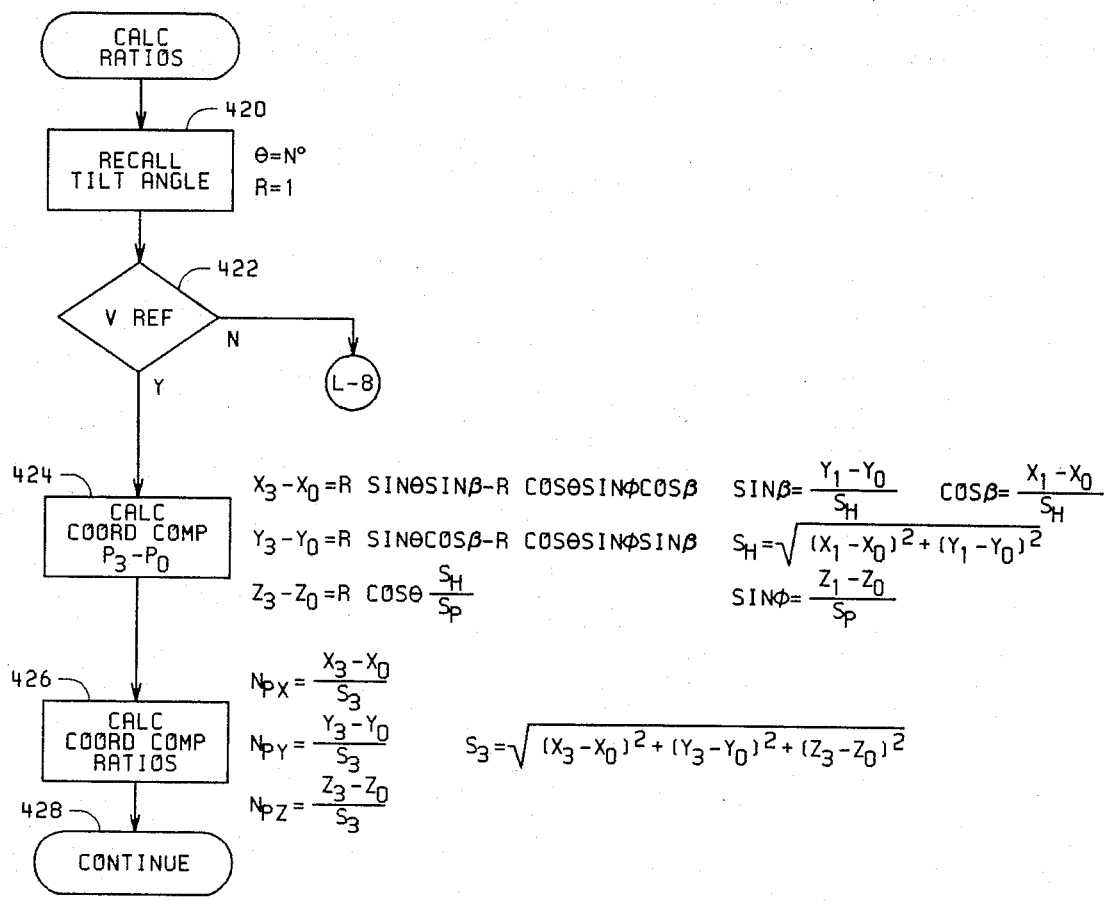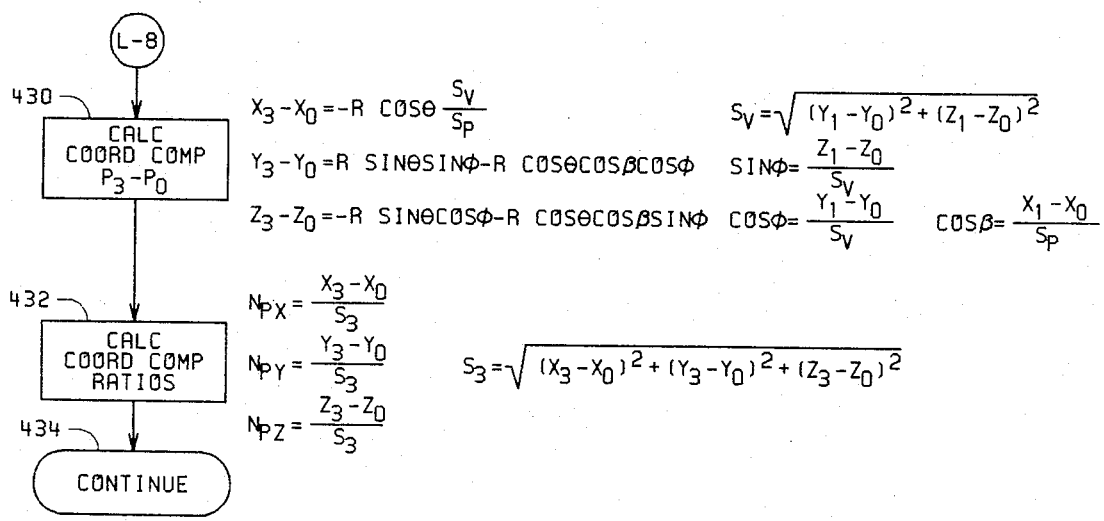
FIG. 8b

4,538,233

APPARATUS AND METHOD FOR OSCILLATORY MOTION CONTROL

BACKGROUND OF THE INVENTION

This invention relates generally to control of motion of a tool along a path. In particular this invention relates to controlling the motion of a point associated with a tool along an oscillatory path in a single plane.

It is well known in seam welding and gluing operations to oscillate a tool about a path to distribute weld metal or adhesive over an area within which the path lies. In seam welding the oscillations effect a distribution of weld metal between the pieces to be joined. When the plane of the oscillatory path is fixed, special apparatus may be provided to effect oscillation of the tool as it is advanced along the path. Apparatus are known in seam welding which impart mechanical oscillation to a weld head as it is advanced relative to a seam. However, where work is carried out by more versatile devices such as numerically controlled machines and manipulators, the accommodation of a variety of work planes presents a difficult control problem.

It is known to superimpose an oscillatory motion pattern on a path vector to effect oscillation about the vector. However the plane of oscillation must be known at the time of storing the oscillatory pattern defining signals and sufficient position location signals must be stored to define the desired oscillatory pattern. Where the tool motion is effected by a manipulator controlled according to a stored program of motions created by manually positioning the manipulator and causing coordinate data of path defining positions to be stored, the programming effort to effect oscillation along a weld seam is unacceptable.

SUMMARY OF THE INVENTION

It is therefore an object of the present invention to provide an apparatus and method for controlling oscillatory motion of a tool along a path in response to input signals defining the path, parameters of the oscillatory motion, and the plane of oscillation.

It is a further object of the present invention to provide a control responsive to input signals defining a path, oscillatory motion parameters, and a point in the plane of the oscillatory motion for controlling oscillatory motion of a point associated with a tool along the path.

It is a still further object of the present invention to provide an apparatus for controlling oscillatory motion of a point associated with a tool in response to input signals representing coordinates of two positions defining a path, and to input signals representing parameters sufficient to define a predetermined oscillatory motion and to input signals representing the tilt of the plane of oscillation from a predetermined reference axis.

Further objects and advantages of the present invention shall become apparent from the accompanying drawings and descriptions thereof.

In accordance with the aforesaid objects an apparatus and method for controlling motion of a point associated with a tool carried by a machine are provided. The method and apparatus are responsive to input signals representing coordinates of positions in space between which the point is to be moved along a path and a velocity along the path. Motion is effected by interpolating intermediate positions and producing actuator control signals for causing motion of the machine members to advance the point from one intermediate position to another. To produce oscillation of the tool point about the path, further input signals representing the frequency of oscillation in terms of cycles per unit distance, excursion amplitude and constant amplitude periods are provided. Two alternatives for defining the plane of oscillation are accommodated. In the first a further input signal representing the angle of tilt of the oscillation plane is provided. In the second alternative, input signals representing coordinates of a position having a known relation to a path position and lying in the oscillation plane are provided. In either case the control produces coordinate component ratios to resolve positions in the oscillation plane to the coordinate components of the coordinate axes of the input signal coordinate systems. Oscillatory motion is produced by interpolating intermediate positions, determining the excursion amplitude in accordance with the oscillatory pattern parameters, resolving the oscillatory pattern amplitude to the coordinate components, and modifying the interpolated coordinate components by the amplitude coordinate components to produce a modified interpolated intermediate position determined in accordance with the oscillatory pattern.

BRIEF DESCRIPTION OF THE DRAWINGS

FIGS. 5a and 5b are flow charts of the overall control routines for effecting motion along the path.

FIGS. 6a through 6d are detailed flow charts of selected process steps of the flow chart of FIG. 5a.

FIGS. 8a and 8b are flow charts of the alternative procedures used to produce coordinate component ratios.

DESCRIPTION OF THE PREFERRED EMBODIMENT

For purposes of illustrating the invention, a manipulator and control combination constituting a preferred embodiment shall be described. The manipulator and control correspond to those manufactured by Cincinnati Milacron Inc., the assignee of the present invention. It is to be understood that the particular structure of the manipulator of the preferred embodiment is not to be construed as a limitation on the present invention. Rather, any machine controlled by interpolation of intermediate points along a path defined with reference to a rectangular coordinate system or another suitable predetermined coordinate system is suitable for application of applicants' invention. Further, while the preferred embodiment interpolates linear paths, other paths, circular or parabolic for example, could as well be interpolated. In the preferred embodiment described, the machine structure defines a second coordinate system independent of the rectangular coordinate system.

The motion program is created and stored with reference to the rectangular coordinate system for the convenience of the operator and to facilitate use of control algorithms designed in terms of control of motion in a rectangular coordinate system. The control transforms signals representing rectangular coordinates to signals representing machine coordinates to produce actuator control signals for effecting motion of the machine members. The control techniques for producing oscillatory motion are equally applicable to conventional machine configurations in which machine members move parallel to rectangular coordinate axes.

Figure 1:
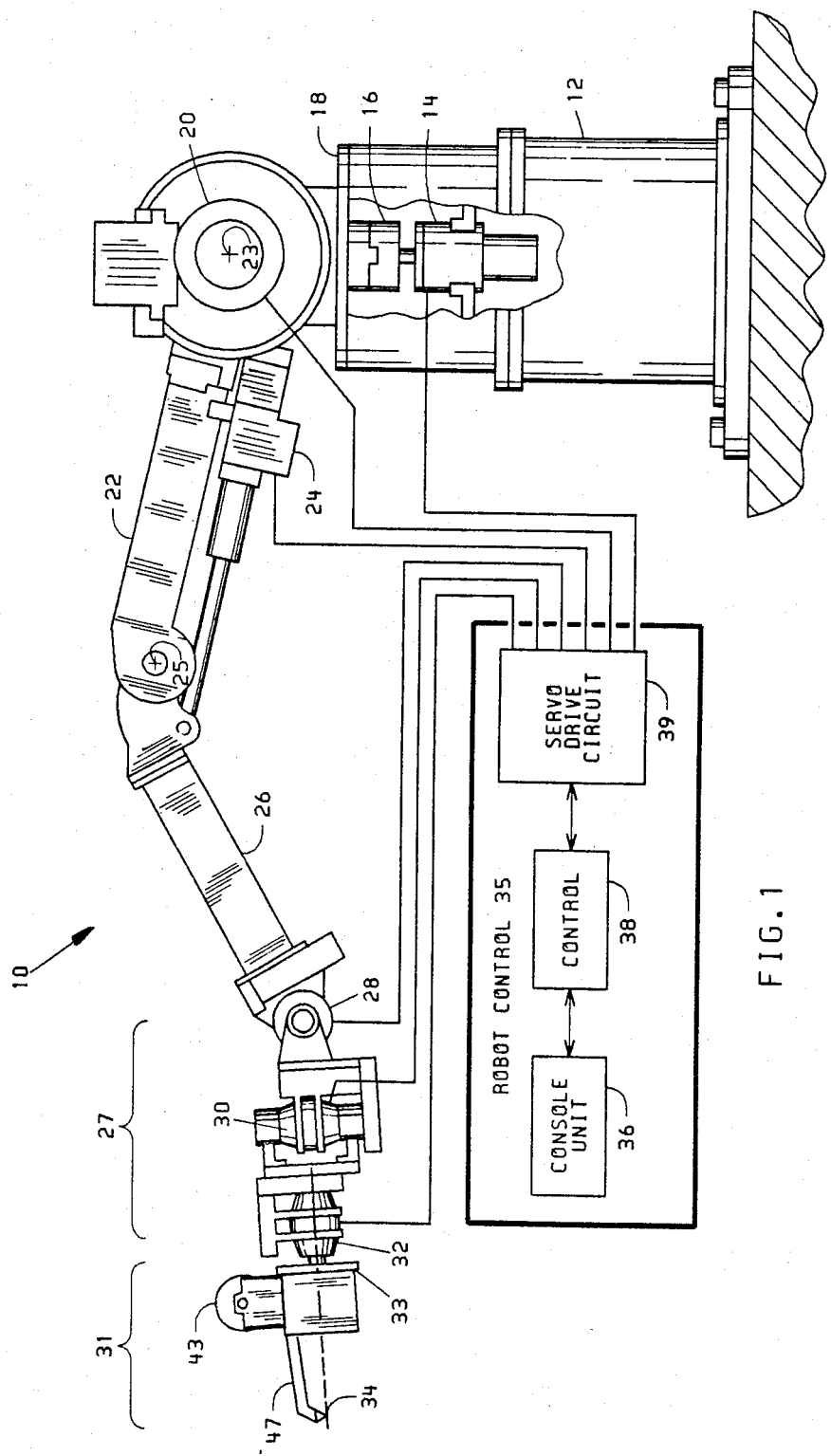
FIG. 1 shows a manipulator and tool carried thereby and the schematic connections to a control.

Referring to FIG. 1, an articulated manipulator 10 is shown connected to control 35 and carrying welding tool 47. The manipulator 10 includes base 12 upon which is rotatably mounted the shoulder plate 18 and within which are the shoulder rotation actuator 14 and the intermediate coupling 16. Actuator 14, coupling 16 and mounting plate 18 cooperate to effect rotation of the manipulator structure about a vertical axis passing through the center of plate 18. Upper arm 22 is rotatably supported upon plate 18 at the shoulder joint 23 and rotated about a horizontal axis intersecting the vertical axis through the center of the shoulder joint 23. Rotation of the upper arm 22 about this axis is effected by actuator 20. A forearm 26 is connected to upper arm 22 at an elbow joint 25 and is rotated thereabout by means of actuator 24 which may be a lineal actuator such as a piston and cylinder or screw and nut. The actuators 14, 20, and 24 are sufficient to effect motion of the forearm 26 to place the end thereof in any position within the volume described by the mechanical limitations of the structure.

To maximize the flexibility of motion achieved by control of the manipulator, three additional axes of motion follow forearm 26. These three additional axes are intended to effect control over the orientation of the tool carried by the manipulator with respect to a relocatable point of reference. The first of these orientation axes corresponds to a rotation about a horizontal axis at the end of the forearm 26 driven by actuator 28 to effect changes in pitch of a tool carried by the manipulator. The second orientation axis is vertical and perpendicular to the first and effects changes of yaw of the tool carried by the manipulator and is driven by actuator 30. The third orientation axis for controlling roll is perpendicular to the second axis and is driven by actuator 32. These three orientation axes constitute the wrist 27 of manipulator 10.

At the end of wrist 27, is the face plate 33 to which is mounted a welding torch 47 and its associated wire feed reel 43. Torch 47 constitutes a function element 31 carried by manipulator 10. Other tools may be readily substituted including workpiece grasping devices to effect motion of workpieces relative to fixed tools. The stored program for controlling the motion of function element 31 specifies positions of a tool centerpoint 34 and orientations of the function element 31 with respect to the relocatable tool centerpoint 34.

Control 35 includes a console unit 36 to permit communication between an operator and the manipulator 10, a control 38 for processing a stored program directing the movements of manipulator 10, and a servodrive circuit 39 responsive to control 38 for controlling the machine actuators 14, 20, 24, 28, 30 and 32. Since the particular type of actuators and drive circuits do not form a part of the present invention, further details of these devices shall not be provided.

Figure 2:
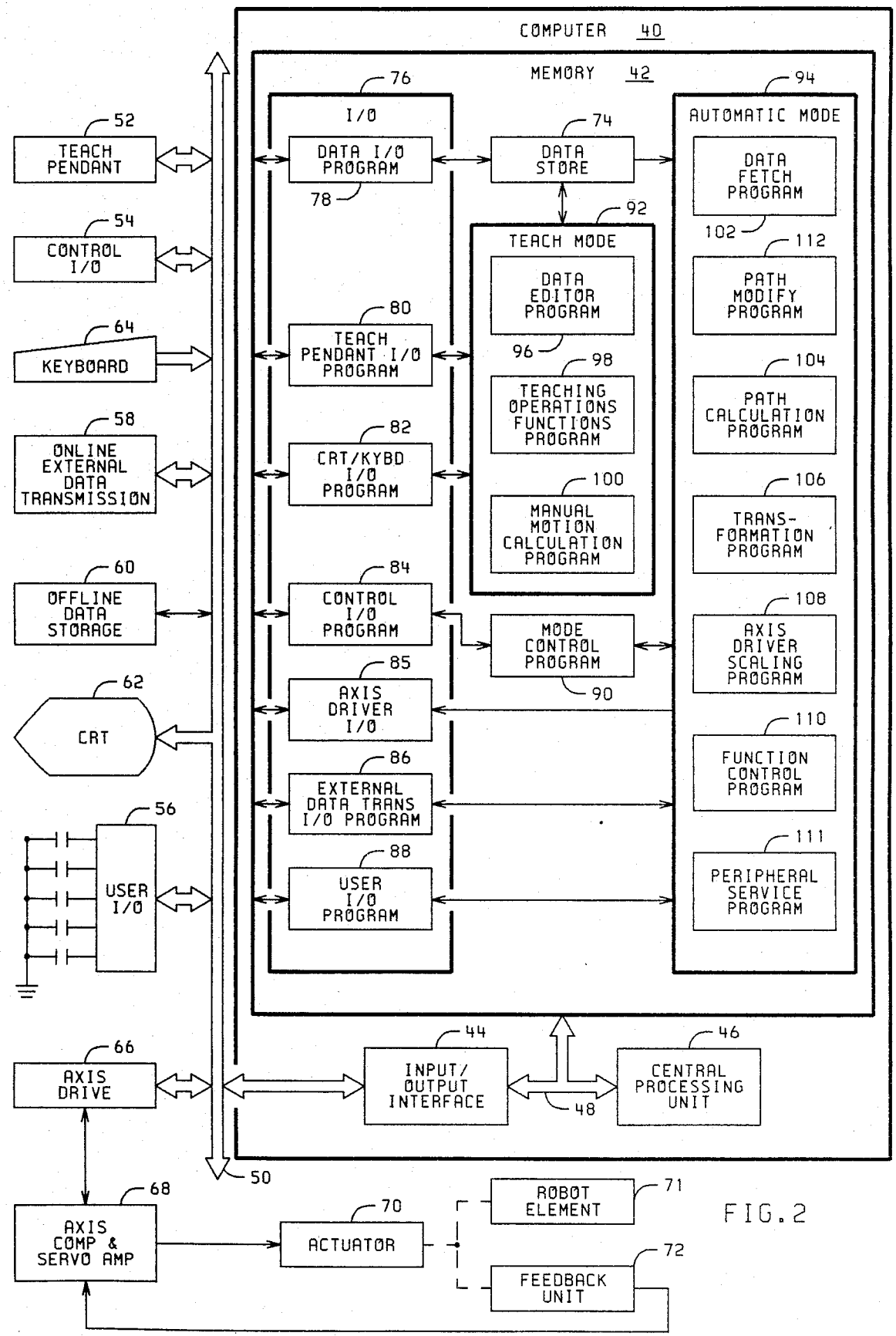
FIG. 2 is a block diagram of the control of FIG. 1.

Referring to FIG. 2, a detailed block diagram of the control shall be described. The control 35 includes a programmable general purpose digital computer 40 comprised of a memory 42, a central processing unit 46 and an input/output interface 44. These three elements are interconnected by bus 48. Interaction between computer 40 and the manipulator 10 and an operator are carried out by signals passed over the external bus 50 connected to a number of peripheral devices. The peripheral devices most suitable for use by an operator include the teach pendant 52 for manually producing motion commands to generate a stored program, keyboard 64 for entering information to computer memory 42 and CRT 62 for displaying data relating to the current activity of the manipulator and its stored program.

The peripheral devices used to interface the manipulator 10 to control 35 include: the control input/output interface 54, which exchanges a number of discrete device signals between the manipulator and control necessary for the operation of manipulator 10; the user input/output interface 56 which exchanges signals to and from application dedicated devices associated with manipulator 10; and the axis drive interface 66 which directly controls the motion of the actuators. The axis drive 66 accepts data in digital form and executes a digital-to-analogue conversion thereby providing an analogue signal to the axis compensation and servoamplifier 68. The compensated analogue signals are then used as an input to an actuator 70 which drives the robot element 71 mechanically attached thereto. A feedback device 72, mechanically connected to actuator 70 or robot element 71, provides a feedback signal representing the actual motion of the driven element of the robot arm. Although there are several configurations for control of the servomechanism loop for each element of the robot arm, in the preferred embodiment, the axis drive 66, servoamplifier 68, actuator 70 and feedback element 72 are utilized in numbers equal to the number of controlled axes on the manipulator.

Two further peripheral devices permit the exchange of program data. First, the on-line external data transmission interface 58 represents a device which allows data to be entered into the computer 40 from an external data store while the manipulator is executing a cycle of operation. Second, an off-line data storage interface 60 is provided for allowing program data to be input to the computer by means of such devices as a punched tape reader, a cassette reader, etc.

The memory 42 within computer 40 is comprised of two primary components. The first is the data store 74 which stores all numerical data information, and the second component defines the operating system of the manipulator. The operating system is a set of control programs directing the operation of computer 40 to effect the generation of the users program and the execution of the stored user program. For purposes of illustration, the operating system programs are shown in functionally related sets including the input/output set 76, the teach mode set 92, and the automatic mode set 94.

Included in the input/output set 76, are the data I/O program 78, teach pendant I/O program 80, a CRT and keyboard I/O program 82, a control I/O program 84, an axis driver I/O program 85, an external data transmission program 86 and the user I/O program 88. Each of these input/output programs correspond to a different type of peripheral device being interfaced to the control and is effective to control the signal exchange between the particular peripheral device and the computer 40.

The operating system also contains a mode control program 90 for switching control of the computer between the various operating modes, for example, manual, teach, automatic, etc. Since only the automatic mode is required for the disclosed invention, only this mode will be described in detail. Within the teach mode system 92 are the data editor program 96, the teaching operation function program 98 and a manual motion calculation program 100. These three programs control the operation of the manipulator during the teach mode, and the specifics of these programs are either described in U.S. Pat. No. 3,920,972 or are available from Cincinnati Milacron Inc. The automatic mode set 94 includes a data fetch program 102, a path calculation program 104, a transformation program 106, an axis driver Program 108, a function control program 110, a peripheral service program 111, and a path modification program 112. Details of the path calculation program and path modification program shall be provided herein and details of the other programs are either specifically described in U.S. Pat. No. 3,909,600 or are available from Cincinnati Milacron Inc.

Figure 3:
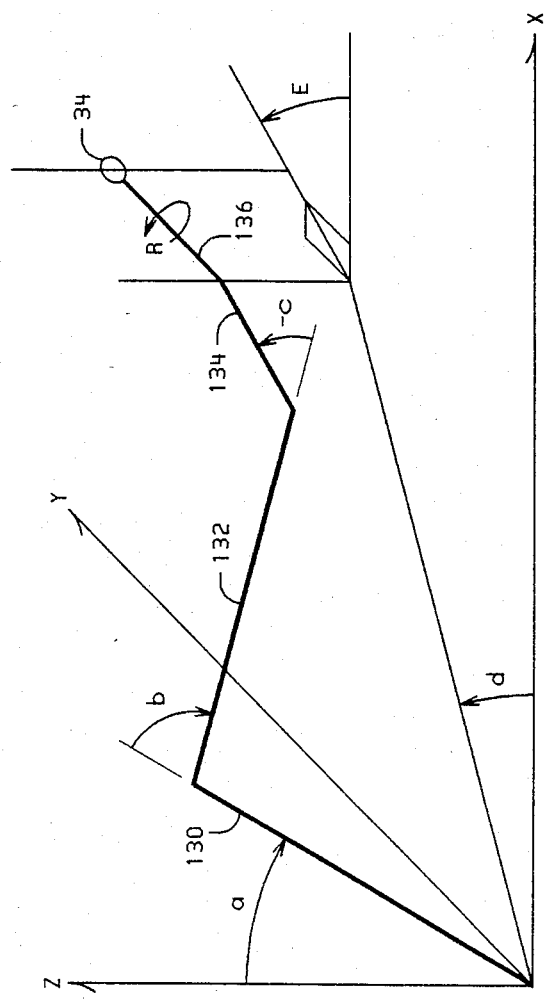
FIG. 3 is a schematic representation of the manipulator members and motions thereof.

The machine coordinate system of manipulator 10 shall be described with reference to the schematic representation of FIG. 3. As has heretofore been described, each axis of motion of manipulator 10 is an axis of rotary motion. Assume that the rectangular coordinate system of FIG. 3 has its origin located at a point slightly above mounting plate 18 and coinciding with the axis of rotation of actuator 20. The Z axis coordinate coincides with the center of rotation of mounting plate 18. Thus, rotations of mounting plate 18 corresponds to motion through the angle "d". Line segment 130 corresponds to upper arm 22, and rotation about the center of actuator 20 corresponds to a rotation of line segment 130 through the angle "a" measured positively with respect to the Z axis in the direction indicated by the arrow. The line segment 132 corresponds to the forearm 26 and rotations of forearm 26 about the elbow joint 25 correspond to rotations of line segment 132 through the angle "b" measured positively in the direction indicated by the arrow in FIG. 3. The first bend axis of the wrist 27 at actuator 28 corresponds to a rotation of line segment 134 through the axis "c" and measured negatively in the direction from the extension of line segment 132 as indicated by the arrow. The second bend axis of wrist 27 corresponding to the rotation of the actuator 30 is illustrated by the rotation of line segment 136 through the angle E measured with reference to the X axis and shown by projection in the X-Y plane. The roll of wrist 27 corresponds to the rotation of line segment 136 indicated by the angle R. The tool centerpoint 34 is defined as a point at the end of line segment 136. The length of segment 136 includes a user specified tool length and the section of wrist 27 beyond yaw axis 30. The stored program includes the X,Y and Z axis coordinates of tool centerpoint 34 together with the angles of orientation D, E, and R. The orientation angle D is equal to the sum of angles "a" "b", and "c". As shown in FIG. 3, tool centerpoint 34 is located about the axis of line segment 136; however, an offset tool centerpoint may also be accommodated. It should now be apparent that provided the lengths of segments 130 through 136 are known and provided the program specifies the orientation angles for pitch, yaw, and roll, D, E, and R, respectively, and provided the X, Y and Z coordinates of tool centerpoint 34 are specified, then the unique combination of actuator angles "a", "b", "c", and "d" can be determined. These actuator angles together with the actuator angles of the orientation axes comprise the machine coordinate system. The details of a transformation from program coordinates to a machine coordinate system neglecting the roll axis R is described in U.S. Pat. No. 3,909,600 wherein the term generalized coordinate system corresponds to the machine coordinate system hereinabove described. The present invention uses the same transformation technique.

Figure 4A:
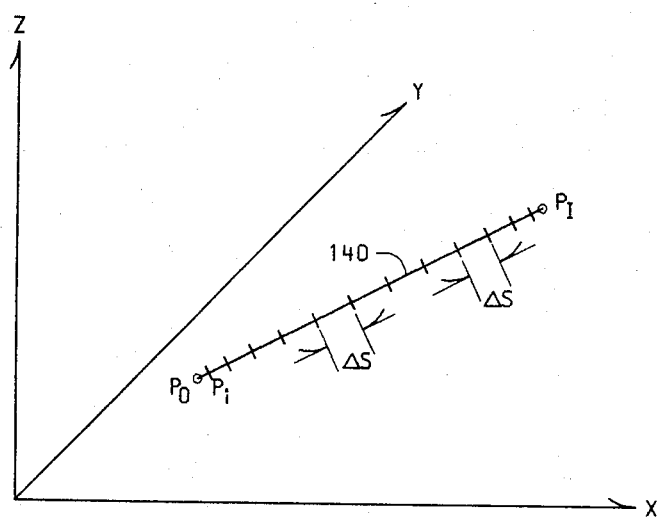
FIG. 4a shows the basic path interpolation effected by the control between two positions defined by input signals.
Figure 4B:
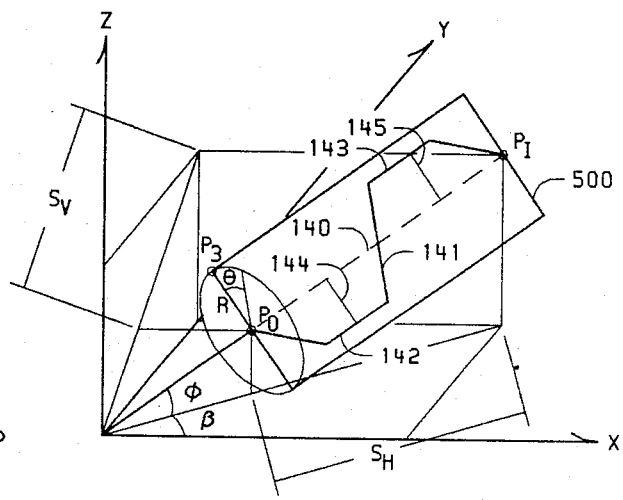
FIGS. 4b and 4c show the oscillatory pattern and two alternatives for defining the plane of oscillation.
Figure 4C:
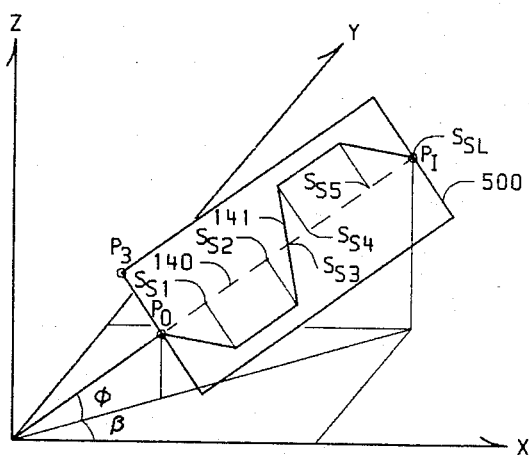

Referring to the geometric schematic representation of FIGS. 4a through 4c the path control scheme of the present invention shall be described. In FIG. 4a, the straight line segment 140 represents the path of motion along which the tool centerpoint is to proceed in travelling from point P0 to point P1 defined by stored input signals. The control interpolates intermediate points $P_i$ along this straight line path. The coordinates of points P0,P1 and the intermediate points $P_i$ are all defined with respect to the X, Y, Z coordinate system. Assuming that the tool centerpoint is to start from rest at point P0, and come to rest again at point P1, then the path control scheme provides automatic acceleration and deceleration to and from a programmed velocity. While the intermediate points $P_i$ are produced in accordance with a fixed increment interval period, the actual incremental distance between points $P_i$ varies as the velocity of the tool centerpoint varies. Thus, the incremental distance $\Delta S$ which corresponds to the distance traversed during a constant incremental interval $\Delta t$ is seen to vary between the constant velocity portion of the motion and the acceleration and deceleration phases of the prescribed motion. The path control scheme above described is similar to that described in U.S. Pat. No. 3,909,600 with the significant exception that in the present path control scheme velocity variations between points P0 and P1 are accomplished in accordance with procedures executed as part of the interpolation process so as to eliminate the discontinuities between the acceleration and deceleration phases.

Referring to FIG. 4b the oscillation pattern is shown as path 141 between points P0 and P1. The straight line path 140 between points P0 and P1 is shown as a dashed line. The oscillatory pattern is described by input signals in terms of the number of cycles per unit distance, the excursion amplitudes to the right and left side of path 140 (shown as the normals 144 and 145 projecting from path 140), and the constant amplitude periods 142 and 143 specified as percentages of the full cycle of the oscillatory pattern. The oscillatory pattern is shown lying in the plane 500 tilted at an angle $\theta$ from the reference axis through point P0. As shown in FIG. 4b path 140 is inclined at an angle $\phi$ to the XY plane. An imaginery circle having radius R normal to the plane 500 is constructed around position P0. The tile angle $\theta$ is defined as the angle from the top of the circle to the intersection of the plane 500 with the plane of the circle. The point of intersection is labeled P3. In extreme cases where the inclination of path 140 to the horizontal is greater than 80° a horizontal reference is used for measurement of the tilt angle $\theta$. It is to be noted that while a single cycle of oscillation is shown in FIG. 4b the control procedure of the present application permits any number of repetitions of the cyclic pattern of oscillation between positions, and continuation of the oscillatory motion through programmed positions. The only limitation on the number of cycles permitted between programmed positions being the determination of whether or not a full cycle or half cycle may be completed within the distance remaining in a programmed path.

The tool center point 34 is caused to follow the path 141 of FIG. 4b by modifying the interpolated intermediate position coordinates of intermediate positions P$_i$ in accordance with the amplitude dictated by the oscillatory pattern and the progression along the path between the programmed positions P0 and P1. Once it is determined that the remaining distance in the programmed span is insufficient for completion of even a half cycle, further excursions from the programmed path are inhibited and the interpolation progresses along the path 140 to position P1. For the sake of generality the path 140 is shown rotated from the X axis at the angle $\beta$.

Referring now to FIG. 4c the oscillatory path 141 in plane 500 is shown as in FIG. 4b. The plane 500 is defined by the coordinates of the positions P0, P1 and P3, as contrasted to the coordinates of positions P0, P1 and the tilt angle $\theta$ of FIG. 4b.

Whether the plane of oscillation is defined by the programmed positions P0, P1 and the tilt angle $\theta$ or by programmed positions P0, P1 and plane defining position P3, the coordinates of intermediate position excursions are resolved into the rectangular coordinate components by use of coordinate component ratios calculated during a span data initialization procedure. Activation of the oscillatory motion is accomplished by means of a function command stored with the position coordinate data associated with position P0 or the beginning position of the oscillatory motion. Oscillatory motion will continue through subsequent positions until an oscillation stop command function is programmed with a programmed position. The oscillatory motion parameters, that is the cycles per unit distance, the amplitudes, and the periods of constant amplitude are represented by input signals generated and stored with the oscillation function command. It will be appreciated that the oscillatory pattern depicted in FIGS. 4b and 4c may be readily divided into segments consisting of: an excursion amplitude increasing or out traverse segment; a constant amplitude segment; an excursion amplitude decreasing or in traverse segment; an out traverse segment; followed by a constant amplitude segment; and an in traverse segment. Other oscillatory patterns may as readily be defined, the relative complexity or simplicity of the pattern being dictated by the particular application. Defining the oscillatory pattern in terms of segments corresponding to progression along the path 140 permits the amplitude of the excursion to be defined in terms of the progression through the oscillatory pattern cycle along the path 140. To facilitate the calculation of pattern amplitude during execution of the oscillatory motion the pattern segment lengths are pre-computed during execution of the oscillation function procedure. Shown in FIG. 4c are segment length designations S$_{sn}$ which represent the segment lengths of the oscillatory pattern. While the excursion amplitudes for each half cycle may be different, the slope of the traverse path to and from path 140 for each half cycle are the same. The predefined pattern shown includes discontinuities associated with the segment lengths. The similarities inherent in the pattern half cycle are used to derive amplitude functions relating segment lengths and amplitudes.

The overall cycle of operation of manipulator 10 in the automatic mode is illustrated by the flow chart of FIG. 5a. At process step 150 the control initializes the span data required to interpolate the motions between the programmed points P0 and P1 at the programmed velocity V$_p$. Values for the programmed span length Sp, the coordinate component ratios N$_{cc}$ and a nominal acceleration are produced by the procedure associated with step 150. At process step 152 an increment along the path is interpolated to produce the incremental distance $\Delta$S and the accumulated incremental distance S$_K$. Process step 156 calls the subroutine to effect a transformation of the interpolated intermediate point to the generalized or machine coordinates. At decision step 154 the flag indicating no deceleration is to take place is tested. When the motion of tool centerpoint 34 is to be continuous through a programmed position, a function attribute so indicating is programmed. It may then occur that no deceleration would be required in the present span and the no deceleration flag would be set as described subsequently. In that case, the process would continue following the yes side of decision step 154 to decision step 155 where it is determined whether the current increment is the last increment of the current span. If not another increment is interpolated through the connector L-2. Eventually, the final increment of the current span would be interpolated and the overall cycle of operation would continue from decision step 155 to process step 168 through connector L3. Process step 168 causes the function programmed with position P1 to be executed when the machine axes have reached the end of span. Thereafter, decision step 170 determines whether the programmed position P1 corresponds to the end of the program. If not, the cycle is repeated by accessing the next programmed data at process step 150 by the connector L-1. If the position is the last position of the program then the entire program is recycled beginning at a preselected programmed position as indicated by terminal 172.

Assuming that the no deceleration flag had not been set, then the overall cycle of operation from decision step 154 continues at process step 158. Process step 158 calculates the distance remaining in the current span prior to the point at which a deceleration to stop must begin. When the remaining distance to the beginning of the deceleration phase S$_{RD}$ is greater than the current incremental distance $\Delta$S, as determined by decision step 160, then the cycle continues through process step 162 which calls the velocity variation subroutine for instantaneously changing or adjusting the incremental velocity value in accordance with nonprogrammed variations of a work process or adaptive parameter or other suitable control parameter. Upon completion of this subroutine the procedure continues through the loop at process step 152 where the span increment is interpolated using the most recently created value of incremental velocity. Once the distance remaining in the span prior to the starting point for deceleration is less than the current incremental distance, then the YES side of decision step 160 leads to decision step 164 which tests for the indication in the stored program that the next point P1 is a continue point. As each point programmed may have associated with it a function signal designating a particular function associated with the work process to be performed at that point, continue points are marked by the presence of a function attribute indicating that the function is to be executed while motion continues. Assuming that the continue code was not detected by decision step 164 then the deceleration procedure is called by process step 166. The deceleration procedure effects the interpolated deceleration to the stopping point P1. Thereafter, process step 168 causes the execution of a function programmed in association with the point P1. Decision step 170 then determines whether or not the current point represents the end of the robot program and if not the procedure continues through the connector L1 to process step 150 to process data for the next programmed position. If the current position is the end of the stored program, then the program is repeated by selecting a program entry designated as a recycle position as indicated by the terminal 172.

If at decision step 164, it had been determined that the next position was a continue point, then the process continues at process step 180 where a new end position for the current span is computed. Because the interpolated intermediate positions are spaced apart by an incremental distance defined by the increment interval period and the effective increment velocity, it is anticipated that when motion is to continue through a programmed position the distance remaining in the span from the deceleration decision position to the programmed end position will not always equal an integral multiple of the current incremental distance. To account for this discrepancy the current span is effectively terminated at the integral multiple of the current incremental distance nearest the programmed end position. To accomplish this, the distance remaining $(S_p-S_k)$ is divided by the incremental distance $\Delta S$ to produce the integer multiple and remainder. The current span length is then reduced by the remainder to produce the continue span length $S_{CP}$. This distance then redefines the end positions of the current span and the start position of the next span.

At decision step 174 a determination is made whether the included angle between the current span and the next span is less than 120 degrees. This determination is made by producing two values $S_T^2$ and $S_{T(120)}^2$ for the square of the total distance between the start position P0 of the current span and the end position P2 of the next span. The first value $S_T^2$ is computed as the sum of the squares of the coordinate component differences between the two positions. The second value $S_{T(120)}^2$ is computed in accordance with the equation for the length of the third side of a triangle given the length of the other two sides and the angle between them:

$$W^2 = A^2 + B^2 - 2AB \cos \gamma$$

which reduces to:
ti $W^2 = A^2 + B^2 + AB$ when $\gamma = 120$ degrees

Since the result of process step 180 was to produce a new end position for the current span the length of the spans have been altered from the programmed lengths. The length of the current span is $S_{CP}$ and the length of the next span $S_N$ is defined by the new start position of step 180 and the programmed end position P2 of that span. If the included angle is less than 120 degrees, then it is necessary to bring the motion to a halt before proceding and the process would again continue through the call to the deceleration procedure at process step 166. If the included angle is 120 degrees or greater, then the process continues at decision step 176 to determine whether or not the programmed velocity of the next span is greater than or equal to the current programmed velocity. If the programmed velocity of the next span is less than the programmed velocity of the current span, then it is necessary to effect a deceleration in the current span so that the motion in the next span will be started at the velocity programmed for that span. Following the deceleration procedure called by the process step 178, the overall cycle is continued at the process step 168 through connector L-3. If the programmed velocity for the next span is in fact greater than or equal to the programmed velocity of the current span, then the process from decision step 176 continues at the process step 177 which sets the no deceleration flag. Thereafter, the overall cycle of operation previously described is resumed through the connector L-2. It should now be apparent from the foregoing description that the overall cycle of operation consists of the repeated interpolation of intermediate positions between the programmed positions by iteratively repeating control processing procedures and by the execution of the functions associated with the programmed positions.

Referring now to FIG. 5b, the routine for servicing the actuator servomechanisms is shown. While the overall cycle of operation is being executed, an independent servointerrupt service routine is processed. A servo system clock generated by central processing unit 46 periodically interrupts the overall system processing to apply the freshly created actuator coordinate data to the actuator servomechanisms. Decision step 192 determines whether or not the buffer storage area for the actuator command data is currently empty. If the buffer is empty, it indicates that the current span has been completed, and the end of span flag is set by process step 194. However, if there is data in the buffer, then process step 196 transfers the data from the buffer to the servo. In either event, the servicing of the servointerrupt is complete and the overall system processing under control of the flow chart of FIG. 5a is continued by the return through terminal 198.

The flow charts of FIGS. 6a through 6d correspond to major segments or subroutines of the flow chart of FIG. 5a. Particularly, the flow chart of FIG. 6a corresponds to the process step 150 of FIG. 5a. At process step 200 programmed span data corresponding to preprogrammed input signals are recalled from data store 74 of memory 42. The start point P0, end point P1 and program velocity $V_p$ define the motion to be next executed by tool centerpoint 34. The programmed coordinate data recalled from memory are shown subscripted in correspondence with the program point designation. At process step 202 the total span length is computed using the rectangular coordinates of the two programmed points and extracting the square root of the sum of the squares of the coordinate components. At process step 204, the in-axis component ratios of the programmed coordinate system are computed by dividing the coordinate components by the span length. These ratios are designated $N_{11}$ through $N_{16}$. Axis component ratios for the orientation angles are computed in the same way as the component ratios for the rectangular coordinate axes. Process step 205 represents the initialization of oscillation pattern data, and the details of the initialization procedure shall be described subsequently. At process step 206, a nominal span acceleration rate is calculated by dividing the programmed velocity $V_p$ by an arbitrarily chosen interval of one quarter second. Once this preliminary computation of span variables is completed, the overall cycle of operation continues through the terminal 208 to the process block 152 of FIG. 5a.

Referring now to FIG. 6b, the process step of interpolation of a span increment corresponding to block 152 of FIG. 5a is expanded into a more detailed flow chart. Beginning at decision step 210, the determination is made whether or not an adaptive or nonprogrammed velocity flag has been set by the subroutine called by process step 162 of FIG. 5a. If there is no adaptive velocity function programmed for the current span, or if the adaptive velocity function has not resulted in a change to the incremental velocity value, then the adaptive velocity flag will not be set and the process will continue at decision step 212. Decision step 212 tests the value of the current incremental velocity signal $V_K$, that is, the incremental velocity for the current iteration K, against the value of the programmed velocity signal $V_p$ to determine whether or not the current incremental velocity is less than the programmed velocity. If so, the process continues at the process step 216 which calls the acceleration subroutine.

The effect of the acceleration subroutine is to produce a new value for the incremental velocity in accordance with a continuous function acceleration factor. Thus, at the beginning of a move where the tool centerpoint starts from rest, the initial value of the incremental velocity shall be zero, the programmed velocity will, of course, be a nonzero value and the call to the acceleration subroutine at process step 216 begins the change of the incremental velocity values $V_K$ in accordance with the continuous function acceleration factor F. Upon completion of the acceleration subroutine, the process will continue at process step 218 where a value for an incremental distance signal $\Delta S$ is calculated in accordance with the formula set forth to the right of the process step of FIG. 6b. This formula produces a distance value by averaging the new incremental velocity value $V_K$ with the previous incremental velocity value $V_{K-1}$ and assuming the average is effective during the period represented by incremental interval signal $\Delta t$. When the incremental velocity $V_K$ is not less than the programmed velocity $V_p$, it is not necessary to calculate a new value for the incremental distance signal and it is only necessary to increment the iteration counter as indicated by process step 214. In either event, the process ultimately resumes at process step 220 where the value of the accumulated increment signal $S_K$ is calculated in accordance with the equation set forth to the right of process step 220. The overall cycle of operation is then continued by the continue of flow chart terminal 221. At this point, the overall cycle of operation continues by the call of process step 156 of FIG. 5a calling the transform subroutine illustrated in the flow chart of FIG. 6c.

Referring to FIG. 6c, at process step 222 the values of the end point coordinate signals representing coordinates with respect to the rectangular or first coordinate system of the accumulated interpolated distance are calculated. This is accomplished by summing the in-axis components of the interpolated incremental distance represented by the increment distance signal $\Delta S$ with the previous values of the end point coordinate signals subscripted K-1. Process step 223 represents the procedure for modifying the intermediate position end point coordinates in accordance with oscillation pattern parameters. The procedure associated with process step 223 shall be described in detail subsequently. Thereafter, the coordinates with reference to the programmed coordinate system of the interpolated point are transformed to coordinates of the generalized or machine coordinate system to produce a set of machine coordinate signals representing coordinate values relative to the machine coordinate system by process step 224. To avoid inverse trigonometric functions, an iterative approximation algorithm is used that produces an error function based on the current machine coordinate values. Details of this approach are shown in U.S. Pat. No. 3,909,600, which, to the extent necessary for describing this transformation algorithm, is hereby incorporated herein by reference. At process step 226, the change in the generalized coordinates is calculated producing actuator control signals representing actuator displacements between the position of the point and the intermediate position. At process step 228 the actuator control signals of the generalized coordinates are stored in the buffer for access by the servointerrupt service routine. When the transformation subroutine is completed, the processing of the overall cycle of operation is resumed by the return through terminal 230. This, then, brings the process to decision step 154 of FIG. 5a. Following step 154 the overall cycle continues at process step 158 where the remaining distance to the beginning of the deceleration span is calculated and the detailed flow chart of this process step is shown in FIG. 6d.

Referring now to FIG. 6d, process step 232 calculates the period required to decelerate using the nominal value of acceleration calculated during the preparation of the span variables. Thus, the approximate time required to decelerate to stop is equal to the quotient of the current incremental velocity $V_K$ and this nominal constant of acceleration. At process step 234, a value of a deceleration distance signal representing the distance required to decelerate is calculated assuming that an average velocity equal to half the current incremental velocity would be in effect during the interval calculated in process step 232. And finally, at process step 236, a value of a span remainder signal $S_{RD}$ is calculated representing the remaining distance within the programmed span length from the current interpolated position to the point at which the just calculated deceleration distance must begin. Thus, the distance remaining $S_{RD}$ is equal to the programmed span length $S_p$ less the portion of the span represented by the accumulated interpolated distance $S_K$ and the portion of the span necessary to decelerate $S_D$. Following this calculation, the overall cycle of operation continues at decision step 160 of FIG. 5a wherein it is determined whether or not this remaining distance $S_{RD}$ is less than the current effective incremental distance $\Delta S$. If the remaining distance $S_{RD}$ is not less than the current effective incremental distance $\Delta S$ then another increment of that distance can be interpolated. If, however, the current effective incremental distance $\Delta S$ is greater than the calculated remaining distance $S_{RD}$, it is necessary to immediately begin deceleration. As was previously stated the decelleration subroutine effects interpolation to the final position P1. Deceleration progresses at an iteratively decreasing velocity following a continuous function to final velocity for the current span. This final velocity may be zero or the starting velocity of the next span.

Figure 7A:
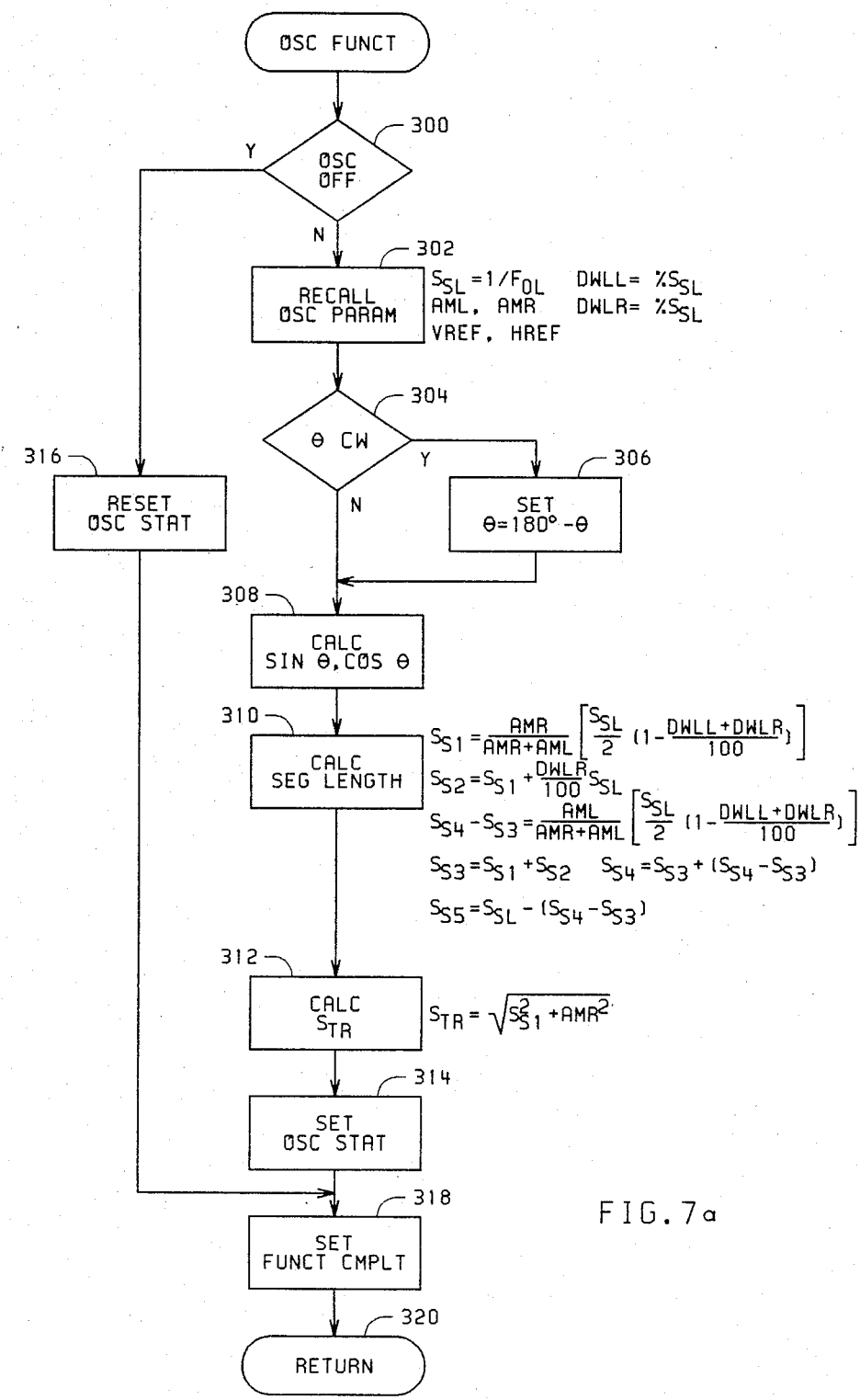
FIGS. 7a through 7c are detailed flow charts of steps of the flow charts of FIGS. 5a, 6a and 6c relating to the oscillatory motion generation.

Referring now to FIG. 7a a flow chart for the oscillation function procedure shall be described. The procedure of FIG. 7a would be executed by process step 168 of FIG. 5a. At decision step 300 the determination is made whether or not the oscillation function programmed commands the termination of oscillatory motion. If it does, process step 316 resets the oscillation status. Thereafter, at process step 318, the function processing complete flag is set and a return to the overall processing of the manipulator control routines is made through terminal 320 bringing exeution to decision step 170 in FIG. 5a.

If at decision 300 of FIG. 7a it had been determined that the oscillatory motion were not commanded to be terminated, then processing would continue at process step 302 which recalls the oscillatory pattern parameter input signals stored with the position coordinate signals associated with the start position of the oscillatory motion. These parameters include the following: the distance per pattern cycle represented by the pattern length signal $S_{SL}$ which is the inversion of the programmed cycles per unit distance represented by the input signal $F_{OL}$, the left amplitude AML, the right amplitude AMR, the constant amplitude left percentage DWLL, the constant amplitudes right percentage DWLR, and, in the case of tilt angle programming, the tilt reference, VR for vertical reference and HR for horizontal reference. Decision step 304 determines whether the tilt angle $\theta$ was measured in the clockwise or counter clockwise directon and if measured in the clockwise direction process step 306 converts $\theta$ to the counter clockwise equivalent. At process step 308 the sine and cosine of the tilt angle $\theta$ are computed. At process step 310 the oscillatory pattern segment signals defining the pattern discontinuity positions are produced in accordance with the formulas set forth to the right of process step 310. The segment length designations $S_{S1}$ through $S_{SL}$ correspond to those illustrated in FIG. 4c. At process step 312 an out traverse length is calculated in accordance with the formula set forth to the right of process step 312. The out traverse length is used to determine the traverse velocity of the tool center point during execution of the oscillation initialization routine. Thereafter at process step 314 the status flag for oscillatory motion is set. At process step 318 the function processing complete flag is set and a return to overall control processing is made through the terminal 320.

While the manipulator control program is designed to execute functions upon completion of a motion, it will now be appreciated that the execution of the oscillatory motion function precedes the span in which the oscillation is to occur. Consequently in the initialization of span data following the execution of the oscillation function procedure, an oscillatory motion initialization procedure corresponding to process step 205 of FIG. 6a will be executed. This procedure performs a variety of tests on the programmed data to insure that osciallatory motion may be executed in the following span and produces the coordinate component ratios from the oscillatory motion plane data.

Figure 7B:
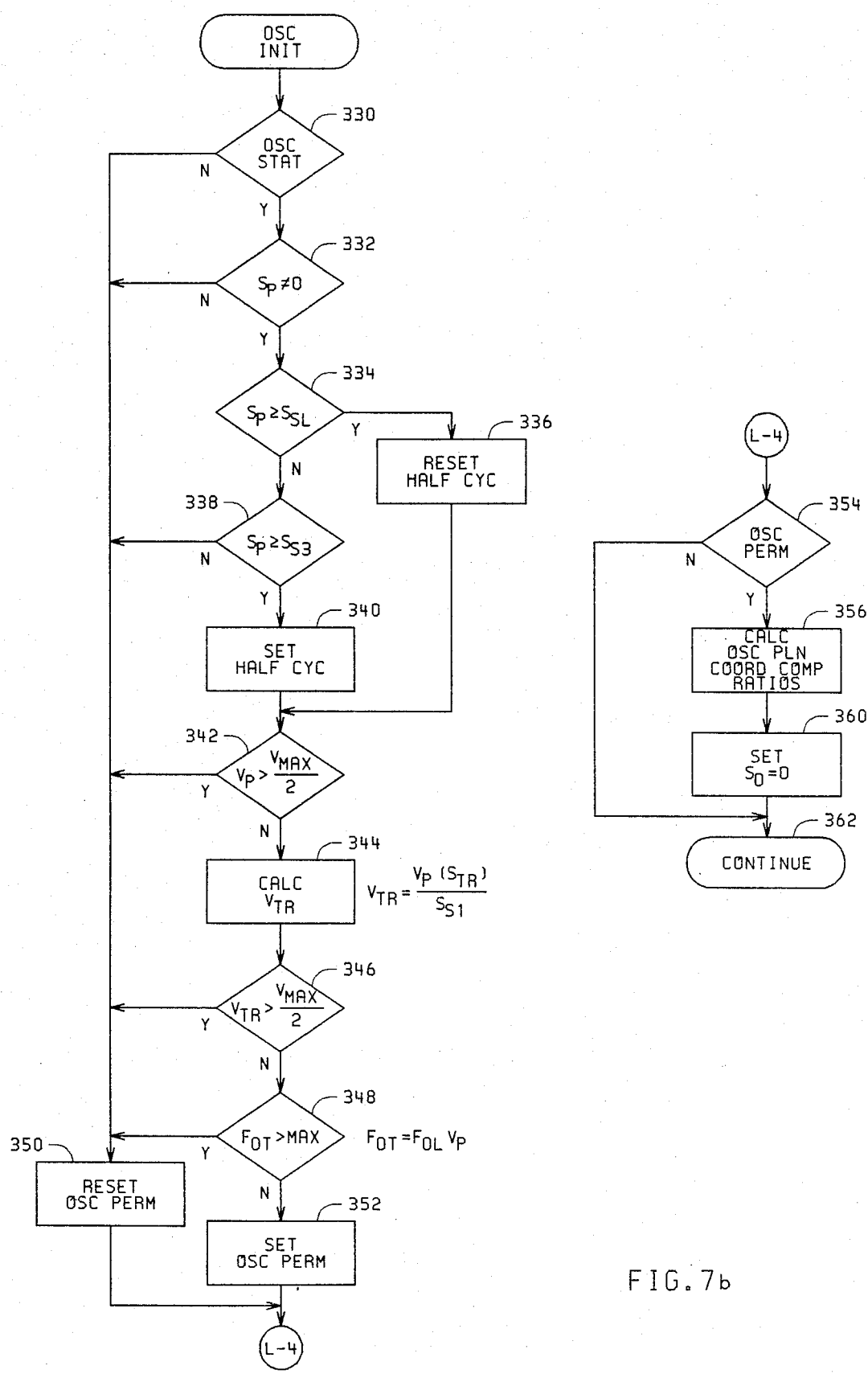

Referring to FIG. 7b the oscillation initialization procedure shall be described. At decision step 330 the osciallatory motion status flag is tested to determine whether or not it has been set by the execution of the oscillatory motion function procedure. If it has, processing continues to decision step 332 where it is determined whether or not the programmed span length $S_P$ is not equal to zero. Assuming that a nonzero length span has been programmed, processing continues at decision step 334 where the programmed span length is compared to the span length required for a complete cycle of oscillation. If the programmed span length is longer than a full cycle of oscillation, the half cycle flag is reset at process step 336. If however the programmed scan length is not longer than the span distance required for a full cycle of oscillation, processing continues at decision step 338 where the programmed span length is compared to the span length required to complete a half cycle. That is the distance corresponding to the total length up to the end of the third segment of the oscillatory pattern. If the programmed span length is not greater than the length required for a half cycle of oscillation, processing continues from the no side of decision step 338 to process step 350 where the oscillation permission is reset. If it is determined by decision steps 334, or 338 that either a full cycle or a half cycle of oscillatory motion may be completed within the programmed span length, processing would continue at decision step 342. At decision step 342 it is determined whether the programmed velocity is greater than half the maximum velocity permitted.

During execution of oscillatory motion the tool center point velocity will exceed the programmed velocity when traversing the programmed path 140. Consequently, if the programmed velocity is greater than half the maximum permitted velocity, then, as a precaution against exceeding the maximum velocity, oscillatory motion is not permitted and the yes side of decision step 342 leads to process step 350 where the oscillatory motion permission is reset. Assuming that the velocity tests of decision step 342 results in a determination that the programmed velocity is not greater than half of the maximum velocity, processing continues at process step 344. The traverse velocity of the oscillatory motion is calculated in accordance with the formula set forth to the right of process step 344. This formula multiplies the programmed velocity by the ratio of the traverse distance to the segment distance of the first excursion from the path 140. By virtue of the pattern illustrated in FIG. 4b and 4c, the traverse rate at the half cycle crossover will be the same as the traverse rate during the first excursion. Therefore, only a single test for the traverse rate need be made. At decision step 346 the traverse rate is compared against half the maximum velocity and if greater than half the maximum velocity, the oscillation permission is reset by process step 350.

Assuming that the traverse rate is not greater than half the maximum velocity, the process continues at decision step 348 where the oscillation frequency, computed as the product of the lineal frequency $F_{OL}$ and the programmed velocity, is compared against a maximum value of two cycles per second. Once again, if the oscillation frequency exceeds the maximum value, process step 350 resets the oscillation permission. Assuming that the tests of decision steps 330, 332, 334, 338, 342, 346 and 348 produce the results necessary to permit oscillatory motion to be executed, process step 352 sets the oscillation permission. Thereafter, through on page connector L-4, the processing continues at decision step 354 which determines whether or not the oscillation permission has been set. If not the process continues in FIG. 6a through the continue of terminal 362. If oscillation permission has been set then process step 356 calculates the axis component ratios of the oscillation plane. Process step 360 initializes the oscillation pattern lineal distance represented by the accumulated pattern distance signal $S_O$ to zero. Thereafter the processing of the initialization procedure of FIG. 6a is resumed by the continue of terminal 362.

Figure 7C:
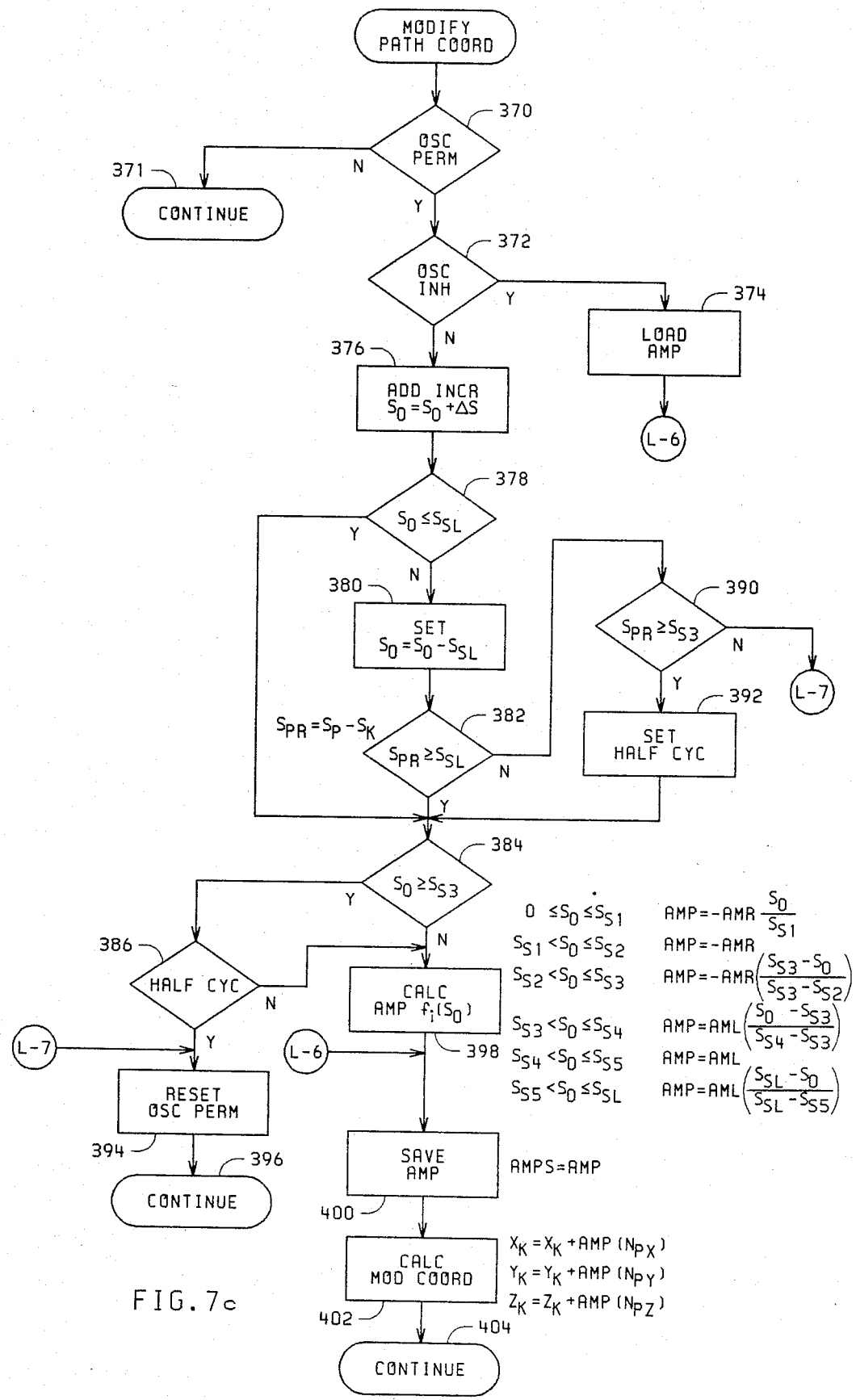

As was previously stated oscillatory motion is effected by modifying interpolated intermediate position coordinate data in accordance with the oscillatory pattern amplitude as determined by the interpolation progress along the path defining the segment lengths of the oscillatory pattern. The procedure for computing the coordinate modifications shall be described with reference to FIG. 7c. This procedure corresponds to process step 223 of FIG. 6c. Referring to FIG. 7c decision step 370 determines whether or not the oscillation permission is set. If not, processing of the flow chart of FIG. 6c is resumed through the continue of terminal 371. Assuming that oscillation permission is set, decision step 372 determines whether or not an oscillation inhibit has been set. Oscillation inhibits may be set by control procedures external to the oscillation control programs. If the oscillation inhibit has been set, processing continues at process step 374 where the current amplitude variable is loaded with the amplitude value saved from the previous intermediate position interpolation. The result of steps 372 and 374 is to continue motion at the same excursion amplitude for increments interpolated during the pendency of the inhibit. Thereafter processing continues through the on page connector L6 at process step 400 which saves the current value of the amplitude. At process step 402 modified intermediate position coordinates are calculated in accordance with the equations set forth to the right of process step 402. Processing of the flow chart of FIG. 6c then continues through the continue of terminal 404.

If it had been determined at decision step 372 that the oscillation inhibit had not been set, processing would continue at step 376 which increments the accumulated oscillatory pattern distance variable $S_O$ by adding thereto the interpolated distance increment $\Delta S$. Thereafter, at decision step 378, the current value of the oscillatory pattern distance is compared against the pattern length $S_{SI}$. If the oscillatory pattern distance $S_O$ is greater or equal to the pattern length, process step 380 sets the oscillatory pattern distance $S_O$ equal to the new value less the pattern length value. Decision step 382 determines whether or not the remaining distance in the programmed span represented by the span remaining signal $S_{PR}$ is greater than or equal to the oscillatory pattern distance $S_{SL}$. The programmed span remaining distance is the difference between the accumulated distance $S_K$ and the programmed distance $S_P$. If the remaining distance in the programmed span is not greater than or equal to the length of the oscillatory pattern, processing continues at decision step 390 to determine whether the remaining programmed distance is greater than the half cycle oscillatory pattern length represented by $S_{S3}$. If the remaining distance is not greater than the half cycle distance $S_{S3}$, processing continues through the on page connector L-7 at process step 394 which resets the oscillatory motion permission. Thereafter, processing of the flow chart of FIG. 6c continues through the continue of terminal 396. If it had been determined that the remaining distance, though less than the full cycle distance of the oscillatory pattern, was greater than or equal to the half cycle distance, process step 392 would set the half cycle flag.

If it had been determined at decision step 378 that the accumulated oscillatory motion distance were not greater than the pattern length, or, if it had been determined at decision step 382 that the remaining programmed span distance were greater than the pattern length, or, at decision step 390 that the remaining programmed distance were greater than the half cycle pattern length, processing would continue at decision step 384. At decision step 384(a), it is determined whether or not the current accumulated pattern distance $S_O$ is greater than or equal to the half cycle length $S_{S3}$. If it is, processing continues at decision step 386 where it is determined whether or not the half cycle flag has been set. If so processing continues at process step 394 where the oscillation permission is reset. If not, or if the accumulated pattern distance $S_O$ is not greater than or equal to the half cycle length $S_{S3}$, then processing continues at process step 398 where the amplitude of the oscillatory pattern is calculated.

As previously stated the amplitude calculation depends on the progress through the weave pattern as determined by the accumulated oscillatory pattern distance $S_O$. The value of this distance is compared to the segment break point values $S_{S1}$ through $S_{SL}$. The appropriate amplitude function defining a segment amplitude function signal associated with each segment is then selected based upon the results of this comparsion and an amplitude value is computed and loaded into the amplitude variable. At process step 400 the amplitude value is saved and at process step 402 the increment coordinate signals representing coordinates of the intermediate position are produced using the current value of the amplitude and the plane coordinate component ratios to produce amplitude coordinate component signals representing the coordinate components of the incremental amplitude. Thereafter, processing of the flow chart of FIG. 6c resumes by the continue of terminal 404. It will be appreciated that the values created for the amplitude variable define incremental pattern amplitude signals representing the amplitude of the excursion of the cyclic pattern for each increment along the path 140.

As previously stated two alternatives are accommodated for defining the plane of the oscillatory motion pattern and consequently two alternative procedures for computing the coordinate components of positions within the plane are provided. These alternative procedures shall be described with reference to FIGS. 8a and 8b. These procedures correspond to process step 356 of FIG. 7b.

Figure 8A:
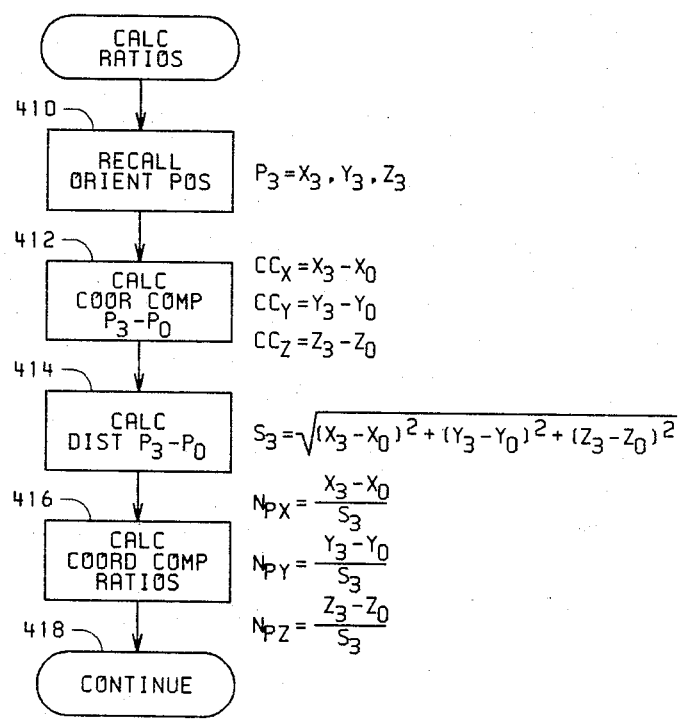

Referring to FIG. 8a a first alternative procedure associated with a position input signal defining the plane shall be described. At process step 410 the coordinates of the oscillatory motion plane defining position are recalled. This position is designated as P3 and the rectangular coordinates of this position are designated as $X_3$, $Y_3$, and $Z_3$. The position P3 is on the line perpendicular to the path 140 from the position P0 and lies in the plane 500. At process step 412 the coordinate components of the line P0-P3 are computed. These components are designated as $CC_X$, $CC_Y$, and $CC_Z$. At process step 414 the distance between points P0 and P3 is computed and designated as $S_3$. At process step 416 the coordinate component ratio signals representing the coordinate component ratios of a line normal to the path in the pattern plane are produced by computing the ratio of the coordinate components to the distance $S_3$. These ratios are designated as $N_{PX}$, $N_{PY}$, and $N_{PZ}$. Thereafter, processing of the flow chart of FIG. 7b resumes through the continue of terminal 418.

To avoid the difficulates in locating a position P3 on the perpendicular from the path 140 through position P0, the second alternative for defining the oscillatory motion plane permits the user to specify the tilt angle and then depends upon the control to locate the position P3. The second alternative procedure shall be described with reference to FIG. 8b.

At process step 420 the oscillatory motion plane tile angle θ is recalled. At decision step 422 a determination is made whether or not the angle has been measured with respect to a vertical or a horizontal reference. For the vertical reference case, i.e., the case where the inclination angle φ is less than 80°, the reference line is defined as the radius of the imaginary circle to a point having the most positive Z axis coordinate. For the horizontal reference case, i.e., the case where the inclination angle φ is 80° or more, the reference line is defined as the radius of the imaginary circle to a point having the least positive X axis coordinate. If the vertical reference is used then the coordinate component ratio calculation proceeds through process steps 424 and 426. If not, the computation procedure proceeds through process steps 430 and 432. At process step 424 the coordinate components are computed in accordance with the equations set forth to the right of step 424 using unity as the magnitude of the radius of the imaginary circle normal to the oscillatory motion plane. The sine and cosine values of the angle β representing the rotation about the Z axis are computed for use in the coordinate component calculations using the position coordinate information for the start and end positions of the path 140. The length of the projection of the path length in the horizontal plane is designated $S_H$. In addition, the sine value of the inclination angle φ is computed using the Z axis coordinate components of the positions P0 and P1 and the programmed span length $S_P$. While the assumed value of unity for the radius cannot produce meaningful results in the calculation of the coordinate components the assumed value divides out in the computation of the coordinate component ratios of process step 426. Upon completion of the computations of step 426 the processing of the flow chart of FIG. 7b resumes at process step 360 through the continue of terminal 428. If a horizontal reference had been chosen the computations would be carried out in accordance with the equations set forth at process steps 430 and 432. The overall processing continuing through the terminal 434 at process step 360 of FIG. 7b.

It will be appreciated that the computations of steps 424 and 430 produce coordinate component signals representing the coordinate components of a line normal to the path through the position at which oscillatory motion begins and lying in the pattern plane. Further, steps 426 and 432 respectively produce coordinate component ratio signals representing the coordinate component ratios of the respective normal lines. Thus, the results of the two alternative procedure of FIG. 8a and 8b are equivalent in that the coordinate component ratios are computed for the normal to the path 140 in the pattern plane between positions P0 and P3 whether P3 be defined directly by input signals specifying its coordinate components or indirectly by input signals specifying the tilt angle, the reference line and the direction of measurement of the tilt angle.

While the preferred embodiment has been described in some detail with respect to the particular discontinuous pattern chosen by applicant's for applications in welding, it is to be noted that other suitable patterns of oscillation may be adapted to the control techniques described herein. In addition, continuous oscillatory patterns, expressible as a cyclic function of displacements along the path could be used so long as a suitable expression for the pattern amplitude is assumed in producing incremental amplitude signals. It is not intended to limit the present invention to a particular oscillatory pattern of a particular machine configuration, but rather it is intended to cover all modifications, alterations and equivalents falling within the spirit and scope of the appended claims.

What is claimed is:

1. Method for controlling the motion of a point associated with a function element carried by a machine, the machine having a plurality of movable members and actuators for effecting motion of the function element, the controlled motion describing an oscillatory pattern in a selectable plane through a linear path between two positions, the positions being defined by position input signals representing position coordinates relative to a predetermined coordinate system, the oscillatory pattern defining excursions about the path, the oscillatory pattern being defined by oscillatory pattern parameter input signals, the selectable plane orientation being defined by selectable plane input signals, and the point velocity being defined by a velocity input signal, the method comprising the steps of:

(a) producing an incremental distance signal in response to the position input signals and the velocity input signal, the incremental distance signal representing an increment of displacement defining an intermediate position along the linear path;

(b) producing an incremental pattern amplitude signal in response to the incremental distance signal and the pattern parameter input signals, the incremental pattern amplitude signal representing the amplitude of an excursion described by the oscillatory pattern at the intermediate position;

(c) producing increment coordinate signals in respone to the incremental distance signal, the incremental amplitude signal, and the selectable plane input signals, the increment coordinate signals representing coordinates with respect to the predetermined coordinate system of an intermediate position displaced from the path by the incremental excursion amplitude;

(d) producing actuator control signals in response to the increment coordinate signals, the actuator control signals representing machine member displacements between the position of the point and the position defined by the increment coordinate signals;

(e) applying the actuator control signals to the actuators to effect motion of the point to the intermediate position defined by the increment coordinate; and (f) iterating steps (a) through (e) to move the point along the oscillatory pattern between the two positions.

2. The method of claim 1 wherein the oscillatory pattern is discontinuous and the oscillatory pattern parameter input signals define excursion amplitude limits, pattern lineal frequency, and the pattern discontinuities, and the step of producing the incremental pattern amplitude signal further comprises the steps of:

(a) producing pattern segment signals representing projections in the linear path of pattern segments having continuous amplitude functions between pattern discontinuities;

(b) producing an accummulated pattern distance signal in response to the incremental distance signal, the accummulated pattern distance signal representing a lineal distance of the projection in the path of the portion of the pattern through which the point has been advanced by the incremental displacements;

(c) producing the incremental pattern amplitude signal in response to the pattern segment signals and the accummulated distance signal.

3. The method of claim 2 wherein the step of producing the incremental pattern amplitude signals further comprises the steps of:
(a) producing a span remaining signal in response to the incremental distance signal, the span remaining signal representing the difference between the path length and the accummulation of incremental distance signals from the position at which motion began;
(b) producing a pattern length signal in response to the oscillatory pattern parameter input signals, the pattern length signal representing the length of the projection in the path of one cycle of the oscillatory pattern;
(c) continuing the oscillatory motion following completion of a half cycle thereof when the span remaining is as long as or longer than half the pattern length; and
(d) inhibiting the continuation of oscillatory motion following completion of a half cycle thereof when the length of the span remaining is less than half the pattern length.

4. The method of claim 3 wherein the step of producing an accummulated pattern distance signal further comprises the steps of:
(a) adding the incremental distance signal to the accummulated pattern distance signal;
(b) comparing the accummulated pattern distance signal to the pattern length signal; and
(c) setting the accummulated pattern distance signal equal to the excess over the value of the pattern length signal in response to detecting that the accummulated pattern distance signal is greater than the pattern length signal.

5. The method of claim 1 wherein the selectable plane input signals define a line perpendicular to the path and lying in the oscillatory plane, and the step of producing the increment coordinate signals further comprises the steps of:
(a) producing coordinate component ratio signals in response to the position input signals and the selectable plane input signals, the coordinate component ratio signals representing factors for resolving a pattern amplitude into its respective coordinate components relative to the predetermined coordinate system;
(b) producing amplitude coordinate component signals in response to the coordinate component ratio signals and the incremental pattern amplitude signal, the amplitude component signals representing the coordinate components of the pattern amplitude; and
(c) producing the increment coordinate signals in response to the amplitude coordinate component signals and the incremental distance signal.

6. Apparatus for controlling the motion of a point associated with a function element carried by a machine having a plurality of movable members and actuators for effecting motion of the function element, the controlled motion describing an oscillatory pattern in a selectable plane through a linear path between two positions defined with respect to a predetermined coordinate system, the oscillatory pattern defining excursions about the path, the oscillatory pattern being defined by oscillatory pattern parameter input signals, the selectable plane orientation being defined by selectable plane input signals, the positions being defined by position input signals and the point velocity being defined by a velocity input signal, the apparatus comprising:
(a) means responsive to the position input signals and the velocity input signal for iteratively producing incremental distance signals, each incremental distance signal representing an increment of displacement defining an intermediate position along the linear path;
(b) means responsive to the incremental distance signals and the oscillatory pattern parameter input signals for producing incremental pattern amplitude signals, each incremental pattern amplitude signal representing the amplitude of an excursion from the path described by the oscillatory pattern at an intermediate position;
(c) means responsive to the incremental distance signals, the incremental pattern amplitude signals and the selectable plane input signals for producing increment coordinate signals representing coordinates with respect to the predetermined coordinate system of an intermediate position displaced from the path the amount of the incremental pattern amplitude; and
(d) means responsive to the incremental coordinate signals for producing actuator control signals representing actuator displacements between the position of the point and the displaced intermediate position, the actuator control signals effecting motion of the machine members to move the point along the pattern.

7. The apparatus of claim 6 wherein the oscillatory pattern is discontinuous and the oscillatory pattern parameter input signals define excursion amplitude limits, pattern lineal frequency, and the pattern discontinuities and the incremental pattern amplitude signal producing means further comprises:
(a) means for producing pattern segment signals representing projections in the linear path of pattern segments having continuous amplitude functions between pattern discontinuities;
(b) means responsive to the incremental distance signals for producing an accummulated pattern distance signal representing a lineal distance of the projection in the path of the portion of the pattern through which the point has been advanced by the incremental displacement; and
(c) means responsive to the accummulated pattern distance signal and the pattern segment signals for producing the incremental pattern amplitude signals.

8. The apparatus of claim 7 wherein the incremental pattern amplitude signal producing means further comprises:
(a) means responsive to the incremental distance signals for producing a span remaining signal representing the difference between the path length and the distance moved along the path;
(b) means responsive to the oscillatory pattern parameter input signals for producing a pattern length signal representing the length of the projection in the path of one cycle of the oscillatory pattern; and
(c) means responsive to the pattern length signal and the span remaining signal for inhibiting the oscillatory motion following completion of a half cycle thereof when the length of the span remaining is less than half the pattern length.

9. The apparatus of claim 6 wherein the selectable plane input signals define an angle of tilt of the selectable plane measured from a reference in a plane normal to the path and the increment coordinate signal producing means further comprises:

(a) means responsive to the position input signals and the selectable plane input signals for producing coordinate component ratio signals representing factors for resolving the pattern amplitude into coordinate components relative to the predetermined coordinate system;

(b) means responsive to the coordinate component ratio signals and the incremental pattern amplitude signals for producing amplitude coordinate component signals representing the coordinate components of the pattern amplitude; and (c) means responsive to the amplitude coordinate component signals and the incremental distance signals for producing the incremental coordinate signals.

10. The apparatus of claim 6 wherein the selectable plane input signals define the coordinates with respect to the predetermined coordinate system of a position in the plane of oscillatory motion and lying on a perpendicular from the path and the increment coordinate signal producing means further comprises:

(a) means responsive to the position input signals and the selectable plane input signals for producing coordinate component ratio signals representing factors for resolving the pattern amplitude into coordinate components relative to the predetermined coordinate system;

(b) means responsive to the coordinate component ratio signals and the incremental pattern amplitude signals for producing amplitude coordinate component signals representing the coordinate components of the pattern amplitude; and (c) means responsive to the amplitude coordinate component signals and the incremental distance signals for producing the increment coordinate signals.

11. The apparatus of claim 6 wherein the machine has at least two members joined by an axis of rotation and the movable machine members and actuators define a machine coordinate system and the means for producing actuator control signals further comprises means for transforming signals representing coordinates measured relative to the predetermined coordinate system to signals representing coordinates measured relative to the machine coordinate system.

12. The apparatus of claim 11 wherein the predetermined coordinate system is a rectangular coordinate system.

* * * * *